Aug. 20, 1929.  W. E. TRUFANT  1,725,382
CRANBERRY PICKING MACHINE
Filed Feb. 28, 1921   3 Sheets-Sheet 1
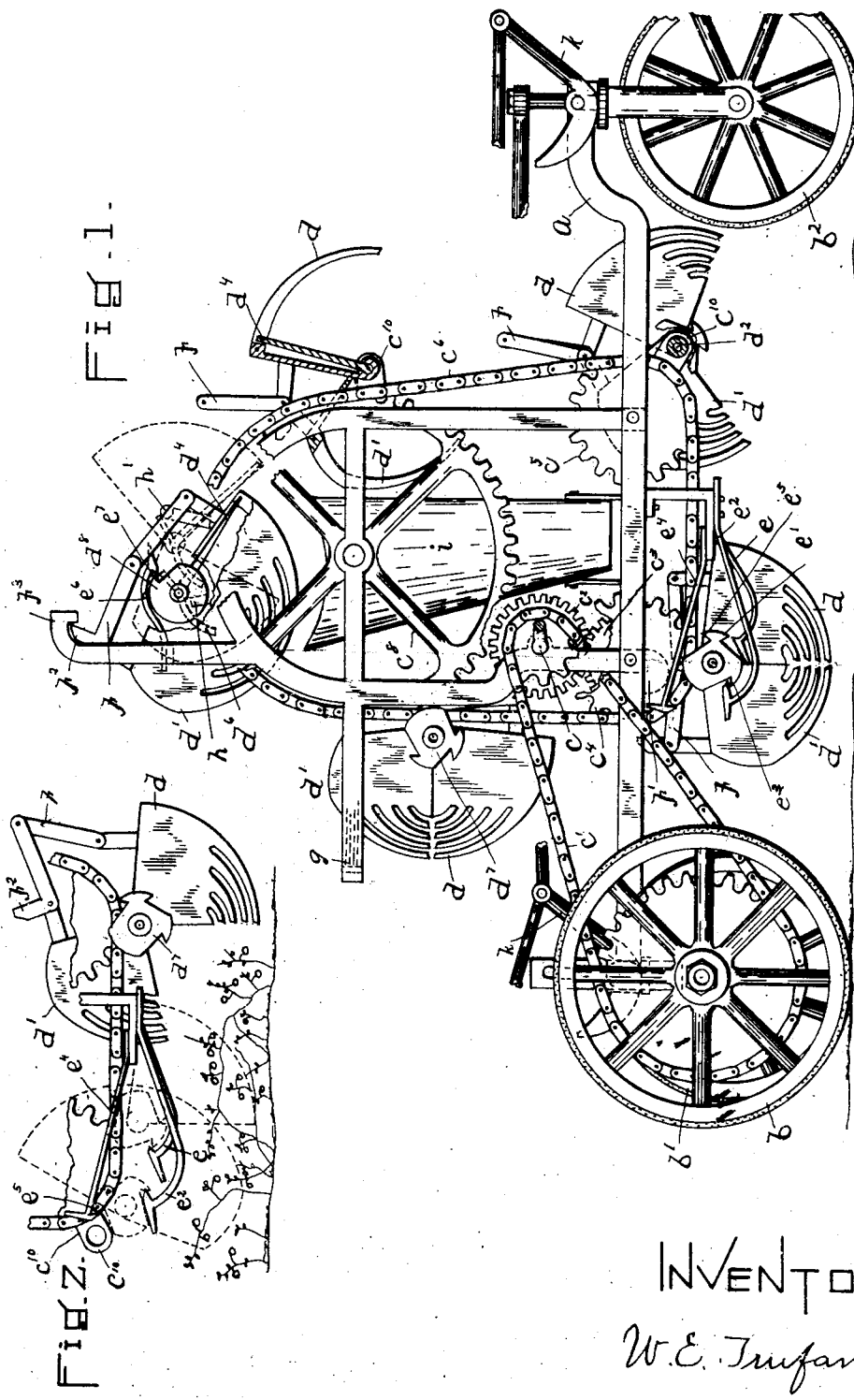
INVENTOR.
W.E. Trufant.

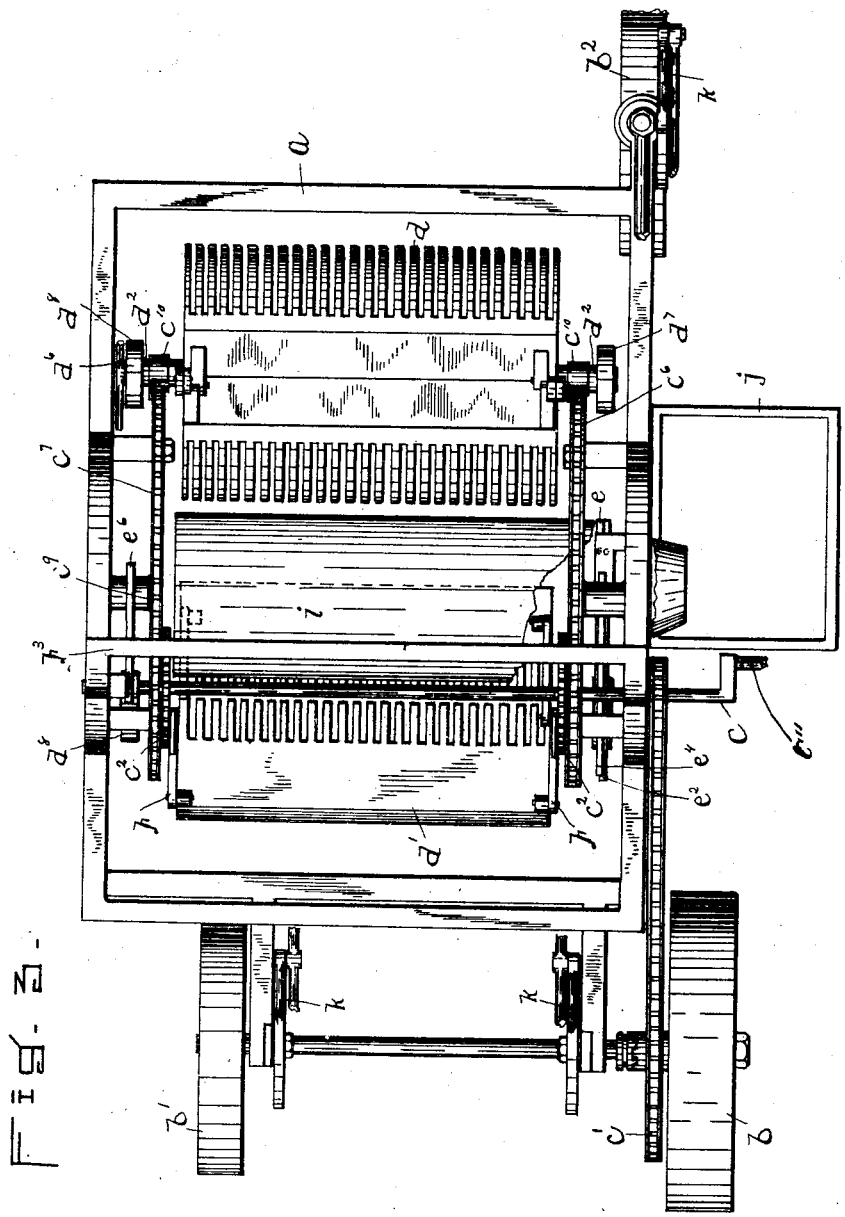

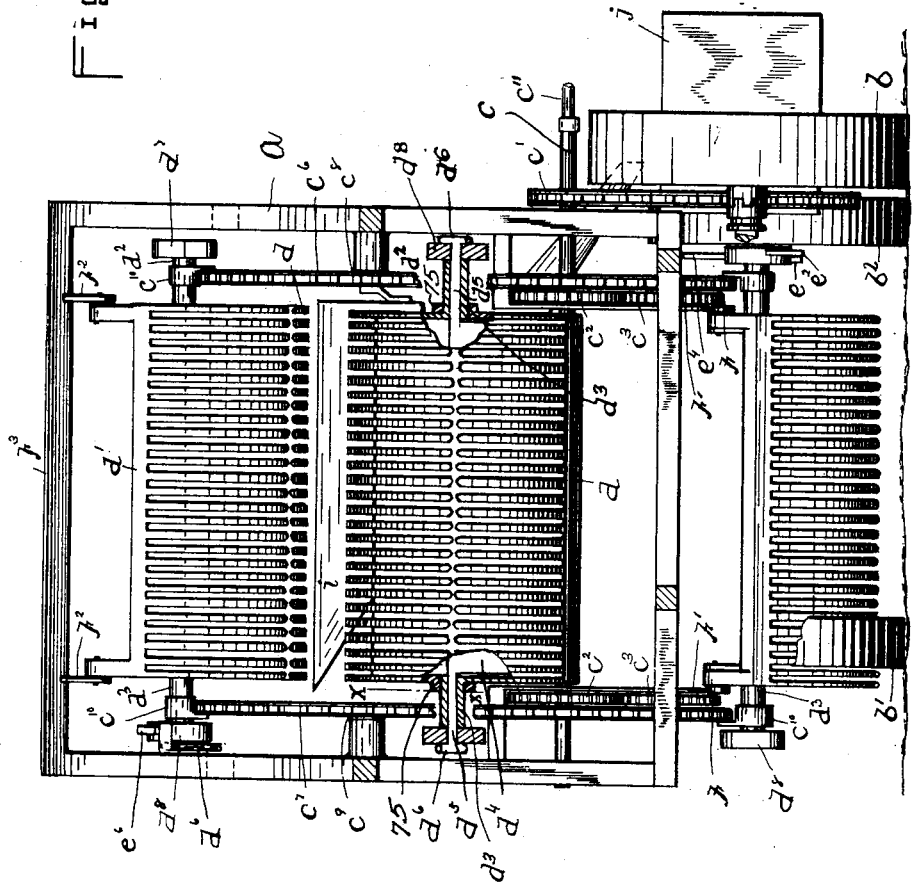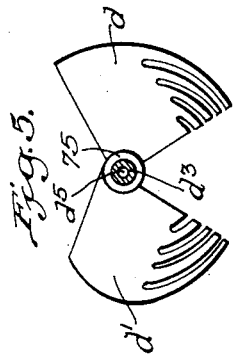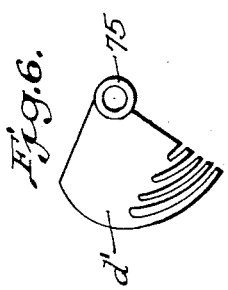

Patented Aug. 20, 1929.

1,725,382

UNITED STATES PATENT OFFICE.

WALTER E. TRUFANT, OF WHITMAN, MASSACHUSETTS.

CRANBERRY-PICKING MACHINE.

Application filed February 28, 1921. Serial No. 448,407.

This invention relates to machines for pickling cranberries and the like and has for its object to provide a machine which will pick cranberries with less damage to the bog than present methods and do it more quickly so that all the berries may be picked when of the proper ripeness and also to waste less berries in picking.

The cranberry grows on a very low shrub and propagates itself by layers and will take root wherever the branches strike the moist earth. The plant sends out long vine-like branches called runners which may pass over, through, or under the vine mass, and root in wherever they strike the ground. On this account the bog presents a very tangled condition. For the last few years most of the berries have been picked with a sort of comb called a scoop which is operated by hand and thrust into the vines parallel with the ground and then lifted combing the berries from the vines. As the berries grow on short uprights which start out all along the runners some of the berries are very near the ground and some above the vine mass. For this reason if the scooper tries to get all the berries, when he raises the scoop it pulls up part of the vines, breaks others and loosens or strains nearly the whole mass of vines. For this reason no attempt is made to get all the berries but to get as many as possible without doing too much damage to the bog. But the damage done by the most careful scooping is very great and bogs have shown a large decrease in yield.

To the end stated my invention consists in forming my apparatus so that it will allow the tangled vines to slip out of the scoop while the berries are retained, and in means for operating my scoop and delivering the berries into a proper receptacle. The details of my invention will be further hereinafter described and pointed out in the claims.

In the accompanying drawings forming a part of this specification,

Fig. 1 is a side view of my machine,

Fig. 2 shows one of the scoops of Fig. 1 in a different position,

Fig. 3 is a plan of the machine the three upper scoops being removed,

Fig. 4 an end view of the same parts thereof being in section.

Fig. 5 is a section on the line $x$—$x$ of Fig. 4; and

Fig. 6 is an end view of one of the scoop sections.

In all the figures like letters refer to like parts and in all some of the parts are omitted for the sake of clearness.

In the drawings $a$ is the frame of the machine carried by the driving wheel $b$ supporting wheel $b^1$ and steering wheel $b^2$. Power to operate the machine is applied preferably by a gasoline engine a part only of the shaft $e''$ of which is shown, or by any suitable means to the driving shaft $c$ and carried by the chain $c^1$ to the driving wheel and by the gears $c^2$ $c^3$ to the sprocket wheels $c^4$ and $c^5$. These sprocket wheels are one before the other on each side of the machine and carry the chains $c^6$ and $c^7$ which run over the large sprocket wheels $c^8$ and $c^9$. To the chains $c^6$ and $c^7$ are fixed the lugs $c^{10}$ which carry the scoops, there being five such scoops shown in the illustrated embodiment of the invention. The scoops are all identical in construction and each comprises two scoop members $d$ and $d^1$ which are pivotally connected together. Each scoop has two trunnions $d^2$, $d^3$ which are journalled in the lugs $c^{10}$ of the chains $c^6$, $c^7$. The trunnion $d^2$ of each scoop is rigid with and forms a part of the scoop member $d$ while the trunnion $d^3$ of each scoop is rigid with and forms a part of the scoop member $d^1$. Each scoop member is formed at the end opposite to that having the trunnion with an ear 75 through which the trunnion of the other scoop member passes, said trunnions and ears 75 forming the pivotal connection between the scoop members.

Inside the scoop is the sweeping board $d^4$ operated by the shaft $d^5$ which extends through the hole in the trunnion and carries a sort of cross bar $d^6$. Also on the trunnions are the disks $d^7$ and $d^8$ which are cut away at intervals in their periphery to form a lip for the engagement of a detent.

I prefer to make the scoops so that when closed they will form practically a half circle with the teeth or tines formed on the circular part. I also prefer to make the tines narrower and nearer together than in the usual construction of the hand scoop. The end of the scoop is slotted as shown to facilitate its entrance into the vines. It is not desirable to have each scoop travel a long distance through the vines as they would tear up the vines and also become clogged. So the scoops are caused to travel from the front toward the back of the machine. This backward travel of the scoops also prevents them from disturbing the unpicked berries as they come out of the vines. It is obvious that if the scoop moves backward at the same rate as the machine travels forward there would be no travel of the scoop through the vines but they would simply dip into the vines, the two movements neutralizing each other, so I prefer to have them travel at about twice the forward speed of the machine so the resultant or actual travel of the scoops through the vines is one half the apparent travel. Before the scoops enter the vines they are opened as shown at the right in Figs. 1 and 3 and as they move around the sprocket $c^5$ the forward section $d$ of the scoop enters the vines so that a tangent to the point of the tines will be parallel with the ground as shown by solid lines in Fig. 2. The scoop then moves along parallel with the ground as shown by dotted lines in the center of Fig. 2. During this movement the berries are combed from the vines and all the short or straight uprights slip out between the tines leaving only the berries and tangled parts of the vines in the scoop, the detent $e$ now engages the lip $e^1$ on the disk $d^7$ and the backward travel of the scoop while the detent holds the periphery of the disk causes the scoop to close as shown by the lower left hand scoop in Figs. 1 and 3. It will be seen that the teeth do not meet when the scoop is closed but leave an open space for the tangled vines to slip out but narrow enough to retain the berries. The detent then automatically releases and detent $e^2$ engages lip $e^3$ which brings the scoop to the position shown by the dotted lines at the left in Fig. 2. It will be noticed that when the detents are engaged the trunnions and the whole scoop is still being carried backward by the chains but that the teeth of the scoop are moving forward, owing to the rocking motion more than overcoming, relative to the vines, the steady backward movement of the carrying trunnions, which tends to untangle the vines and allows those that are looped or tangled about the tines and would otherwise be pulled up or broken to slide along the tines and slip out through the space between the tines of the two members of the scoop. The detent $e^4$ positioned over the disk then engages the lip $e^5$ and returns the scoop to its normal position with the line between the ends of the closed members of the scoop lying in the vertical plane perpendicular to the longitudinal axle of the machine, allowing during this movement vines which may be tangled in the back part of the scoop to slip out. The detents above referred to are made of spring material and are bolted to a bracket secured to the frame of the machine, as shown in Fig. 1. The scoop is locked in closed position by a toggle joint $f$, which is carried by a post on each member of the scoop, the center joint of which is forced by the center line of its connection with the posts as it passes under the bar $f^1$. As the scoop moves up the side of the machine it passes by the brush $g$, shown by dotted lines in Fig. 1, which clears off any matter that may have adhered to the tines. When the scoop reaches the position shown at the top of Fig. 1 the L-shaped member $f^2$ of the toggle joint strikes the crossbar $f^3$ which unlocks the scoop. The detent $e^6$ then engages the lip $e^7$ and opens the scoop as shown by dotted lines in Fig. 1 and as the scoop begins to open the bar $d^6$ which is connected with the sweeping board $d^4$ through the trunnion comes in contact with the post $h$ and swings the board down slightly, and as the scoop opens sweeps out the berries into the chute $i$ which they run down into the bin $j$. After the berries are swept from the scoop the upper end of the bar $d^6$ strikes the stop $h^1$ which swings the sweeping board back to its original position where it is retained by the friction of the parts and the scoop still open returns to the position first described and the whole operation is repeated. The upper scoop at the right in Fig. 1 shows the scoop and sweeping board in cross section. To adjust the working height of the scoop from the ground I provide the cam levers $k$ one over the steering wheel and two at the rear which by pulling backward raise the whole frame of the machine.

It is evident that by changing the relative rate of travel of the scoops and the machine and the horizontal distance between the sprockets $c^4$ and $c^5$ the scoops may be made to travel a long distance in the vines or to make a nearly vertical down and up movement. In very deep and tangled vines a short travel in the vines before the scoop oscillates to clear itself is of course desirable; also the teeth of the two members of the scoop may come in contact provided they are so constructed to spring apart to let the vines out and still retain the berries. The scoop can obviously be made any shape that will clear itself of tangles, after being closed, by a movement in the vines and as many oscillations as desired may be made by the scoop to clear itself before it leaves the vines without departing from the scope of my invention.

What I claim as new, and desire to secure by Letters Patent of the United States, is—

1. In a cranberry picking machine the combination of, a scoop comprised of complementary members formed to open and close, trunnions on each end of the scoop, a chain on each side of the machine to carry the scoop by said trunnions, means for closing the scoop while in the vines, said scoop being formed to leave a space between the tines of its members when closed, means for oscillating the scoop to release the vines, means for opening the scoop, means for ejecting the berries, and means to carry the berries to a receptacle.

2. In a cranberry picking machine the combination of, a supporting frame, means for moving the frame forwardly over the ground, a plurality of scoops composed of complementary members formed to open and close mounted on the frame, means for moving the scoops through the vines in a reverse direction to the forward travel of the frame to pick the berries, means for closing the scoops, and means to give the scoops an oscillating movement in addition to the above mentioned picking movement, each of said scoops being formed to leave a space between the tines of its members when closed to allow tangled vines to slip out.

3. In a cranberry picking machine the combination of, a supporting frame, means for moving the frame forwardly over the ground, a scoop comprised of complementary tined members formed to open and close mounted on the frame, trunnions on each end of the scoop, means for moving the scoop by said trunnions through the vines in a reverse direction to the forward travel of the frame to pick the berries, means for closing the scoop while in the vines, said scoop being formed to leave a space between the ends of the tines of its members when closed, means for giving the scoop an oscillating motion in addition to the picking movement to allow tangled vines to slip out between the ends of the tines, means for opening the scoop, and means for ejecting the berries.

4. In a cranberry picking machine the combination of, a supporting frame, means for moving the frame forwardly over the ground, a scoop comprised of complementary tined members formed to open and close mounted on the frame, trunnions on each end of the scoop, means for moving the scoop by said trunnions through the vines in a reverse direction to the forward travel of the frame to pick the berries, means for closing the scoop while in the vines, said scoop being formed to leave a space between the ends of the tines of its members when closed, means for giving the scoop an oscillating motion in addition to the picking movement to allow tangled vines to slip out between the ends of the tines, and means for opening the scoop.

5. In a cranberry picking machine the combination of, a supporting frame, means for moving the frame forwardly over the ground, a scoop comprised of complementary tined members formed to open and close mounted on the frame, trunnions on each end of the scoop, means for moving the scoop by said trunnions through the vines in a reverse direction to the forward travel of the frame to pick the berries, means for closing the scoop while in the vines, said scoop being formed to leave a space between the ends of the tines of its members when closed, and means for giving the scoop an oscillating motion in addition to the picking movement to allow tangled vines to slip out between the ends of the tines.

6. In a cranberry picking machine the combination of, a supporting frame, means for moving the frame forwardly over the ground, a scoop composed of complementary tined members formed to open and close mounted on the frame, means for moving the scoop through the vines in a reverse direction to the forward travel of the frame to pick the berries, means for closing the scoops while in the vines, said scoops being formed to leave a space between the ends of the tines of its members when closed, means to give the scoop an oscillating motion in addition to the above mentioned picking movement to allow tangled vines to slip out, means for opening the scoop, and means for ejecting the berries.

7. In a cranberry picking machine the combination of, a supporting frame, means for moving the frame forwardly over the ground, a scoop composed of complementary tined members formed to open and close mounted on the frame, means for moving the scoop through the vines in a reverse direction to the forward travel of the frame to pick the berries, means for closing the scoop while in the vines, said scoop being formed to leave a space between the ends of the tines of its members when closed, and means to give the scoop an oscillating motion in addition to the above mentioned picking movement to allow tangled vines to slip out.

8. In a cranberry picking machine the combination of, a scoop comprised of complementary articulated members formed to open and close and having tines for picking the berries, said members being formed so that a tangent drawn from the ends of the tines of the members will be in the same plane when scoop is closed, means for forcing the scoop into the vines to pick the berries, means for closing the scoop, and means to give the scoop an oscillating motion in addition to the above mentioned picking movement while the scoop is in the vines, said members being formed to allow tangled vines to slip out between the ends of the tines when scoop is oscillated.

9. In a cranberry picking machine the combination of, a scoop composed of complementary articulated members formed to open and close and having tines for picking the berries, means having a continuous motion to carry the scoop through the vines during the picking operation in a reverse direction to the forward travel of the machine, means for giving the ends of the tines a motion reverse to and overcoming relative to the vines the continuous movement of the scoop, said scoop being formed to leave a space between the tines of its members when closed through which space the tangled vines are released before the scoop is clear of the vine mass, means for opening and closing the scoop, and means for carrying the berries to a receptacle.

10. In a cranberry picking machine the combination of, a scoop composed of complementary articulated members formed to open and close and having tines for picking the berries, means having a continuous motion to carry the scoop through the vines during the picking operation in a reverse direction to the forward travel of the machine, and means for giving the ends of the tines a motion reverse of and overcoming relative to the vines the continuous movement of the scoop, said scoop being formed to leave a space between the tines of its members when closed through which space the tangled vines are released before the scoop is clear of the vine mass.

11. In a cranberry picking machine the combination of, a supporting frame, means for moving the frame forwardly over the ground, a scoop composed of complementary articulated members mounted on the frame and formed to open and close, means for forcing the scoop into the vines in a reverse direction to the forward travel of the frame to pick the berries, means for closing the scoop, said scoop being formed to leave a space between the tines of its members when closed, through which space the tangled vines slip out when the scoop is rocked, means for giving the scoop a rocking motion in addition to its picking movement means for opening the scoop, and means for ejecting the berries.

12. In a cranberry picking machine the combination of, a supporting frame, means for moving the frame forwardly over the ground, a scoop composed of complementary articulated members mounted on the frame and formed to open and close, means for forcing the scoop into the vines in a reverse direction to the forward travel of the frame to pick the berries, means for closing the scoop, said scoop being formed to leave a space between the tines of its members when closed, through which space the tangled vines slip out when the scoop is rocked, means for giving the scoop a rocking motion in addition to its picking movement and means for opening the scoop.

13. In a cranberry picking machine the combination of, a supporting frame, means for moving the frame forwardly over the ground, a scoop composed of complementary articulated members mounted on the frame and formed to open and close, means for forcing the scoop into the vines in a reverse direction to the forward travel of the frame to pick the berries, means for closing the scoop, said scoop being formed to leave a space between the tines of its members when closed, through which space the tangled vines slip out when the scoop is rocked, and means for giving the scoop a rocking motion in addition to its picking movement.

In testimony whereof I have affixed my signature.

WALTER E. TRUFANT.